UNITED STATES PATENT OFFICE.

DAVID C. SMITH, OF SCHENECTADY, NEW YORK.

PAINT.

1,348,904.      Specification of Letters Patent.     Patented Aug. 10, 1920.

No Drawing.     Application filed January 28, 1920. Serial No. 354,653.

*To all whom it may concern:*

Be it known that I, DAVID C. SMITH, a citizen of the United States, residing at Schenectady, in the county of Schenectady, State of New York, have invented certain new and useful Improvements in Paint, of which the following is a specification.

The present invention comprises a paint which is suitable for coating iron work of all kinds and is particularly useful for coating devices such as radiators and steam pipes which are operated considerably above room temperature.

The only paints heretofore which have been usable for coating radiators or the like are metallic suspensions of bronze, aluminum or the like. In some cases it is desirable that radiators and steam pipes should harmonize with a white or light-colored wall or background. All preparations which have been available prior to my invention discolor when subjected to steam temperatures, that is temperatures above 212° F. Other desirable properties in a paint to render it suitable for use on a radiator is good heat conductivity and mechanical coherence to prevent the paint soiling clothing by accidental contact.

I have discovered that a paint consisting of a suitable mineral pigment suspended in an aqueous solution of glue has the combination of properties above described.

A paint embodying my invention consists by weight of one part magnesia, eight parts whiting (largely calcium carbonate) and one part of a good grade of commercial white glue. These materials preferably are ground together in a dry state. When the paint is to be applied water is added to the mixture, preferably warm water, to produce a paint of the consistency of thick cream.

When this paint is applied to metal surfaces it forms a mat white surface which is permanent, does not rub nor flake off, and is a good heat conductor. My new paint is not in the least affected by temperatures above 212° F. It is even more surprising that such a glue paint remains unaffected by the condensation of moisture on the coated surface. My new paint should not be confused with calcimine preparations which are not suitable for the purposes of my invention.

The paint embodying my invention may be modified by the addition of pigments, but it is particularly advantageous where a pure white flat surface is desired.

What I claim as new and desire to secure by Letters Patent of the United States, is:—

1. A paint adapted for use at high temperature comprising magnesia, whiting, water and a water-soluble glue binder.

2. A paint comprising magnesia, calcium carbonate, glue, and water.

3. A paint mixture adapted to be mixed with water comprising by weight about one part magnesia, about eight parts whiting and about one part glue.

4. A paint adapted to produce a hard, mat coating substantially unaffected by steam temperatures comprising about one part magnesia, about eight parts whiting and a water-soluble glue.

5. A paint adapted to produce a hard, mat coating substantially unaffected by steam temperatures comprising an inert filler, magnesia in materially lesser proportion than said filler, a glue binder and water.

In witness whereof, I have hereunto set my hand this 26th day of January, 1920.

DAVID C. SMITH.